UNITED STATES PATENT OFFICE.

RICHARD JUST, OF LUDWIGSHAFEN-ON-THE-RHINE, AND FRITZ ECKHARD, OF MANNHEIM, GERMANY, ASSIGNORS TO BADISCHE ANILIN & SODA FABRIK, OF LUDWIGSHAFEN-ON-THE-RHINE, GERMANY, A CORPORATION.

PIGMENT AND MAKING THE SAME.

1,150,863.      Specification of Letters Patent.      Patented Aug. 24, 1915.

No Drawing.      Application filed October 22, 1912. Serial No. 727,112.

*To all whom it may concern:*

Be it known that we, RICHARD JUST and FRITZ ECKHARD, subjects, respectively, of the King of Saxony and the Grand Duke of Baden, residing, respectively, at Ludwigshafen-on-the-Rhine and Mannheim, Germany, have invented new and useful Improvements in Pigments and Making the Same, of which the following is a specification.

It has been found that vat coloring matters of the anthracene series can be converted into a form in which they are particularly suitable for use as pigments, by oxidizing the separated hydro compounds of the said coloring matters very gradually in air and in the presence of water and of alkali. For instance, the separated hydro compounds obtained for instance in the form of an alkaline paste containing hydrosulfite by filtering off the hydro compound which separates out from the dye-vat, can be stirred slowly in an open vessel in the presence of air, or it can be kneaded, or similarly treated, in order to bring it slowly into contact with air. The coloring matter is thus obtained in a form quite different from that usually obtained when passing air rapidly through a hot solution of the hydro-compound, and it possesses generally a different shade from and greater covering power than the coloring matter obtainable by rapid oxidation of the hydro compound.

The following examples will serve to illustrate further the nature of this invention, which, however, is not confined to these examples. The parts are by weight.

Example 1: Take 100 parts of the hydro compound of the coloring matter known in commerce as indanthrene blue RS and being N-dihydro-anthraquinone-azin corresponding to the formula

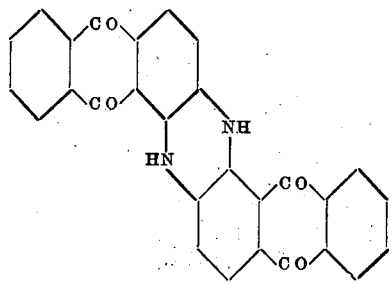

(obtainable as described in the specifications of British Letters Patent No. 3239/01 or No. 22,762/01) in the form of about a 20% paste containing both hydrosulfite and alkali, and stir it slowly, in an open vessel, until by a test portion it is seen that complete oxidation has taken place. The process of oxidation may occupy, for instance, as much as 36 hours. The process can be carried out while allowing from 300 to 500 parts of water to drop slowly into the mixture. Then take up the whole in from 2,000 to 2,500 parts of water and filter, either directly or after making slightly acid and warming to about from 30° to 50° C., and then wash well. The coloring matter when dry is a blue powder with a micro-crystalline structure and yields, when used as a pigment, more reddish shades of blue than does the ordinary coloring matter.

Example 2: Treat the hydro compound of Algol blue K or di-N-methyl-dihydroanthraquinone-azin corresponding to the formula

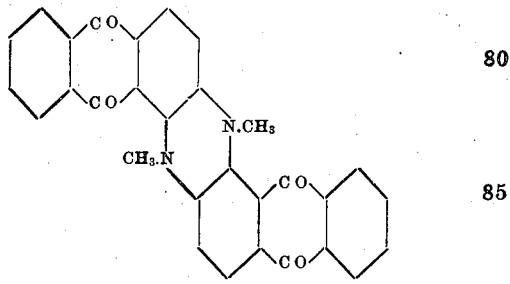

(which hydro compound can be obtained in the form of a brown paste by adding salt to the hydrosulfite vat) in the manner described in the foregoing Example 1. In this way a blue coloring matter is obtained which yields blue shades when employed as a pigment. The initial product yields very much weaker shades.

Example 3: Treat, in the manner described in the foregoing Example 1, the hydro compound of the coloring matter known in commerce as indanthrene red-violet 2RN and obtainable by treating anthraquinone-1.2-acridone with sulfuryl chlorid and chlorin-iodin in the presence of nitrobenzene as described in the Swiss Patent 56472. The said hydro compound can be obtained in the form of a paste by adding salt to the vat. The paste gradually assumes a brilliant bluish red shade and the coloring matter obtained yields pale red pigments.

Example 4: Treat, in the manner described in the foregoing Example 1, the hydro compound of the coloring matter known in commerce as indanthrene violet RR extra obtainable by chlorinating iso-diben-zanthrone as described in Patent No. 1,003,268. The blue coloring matter gradually changes to pure violet and the product yields violet pigments, whereas the initial material gives rise to gray shades.

In a similar manner, other coloring matters of the anthracene series can be converted into a form suitable for use as pigments.

The products obtainable according to this invention are already claimed generically in claim 4 of Patent No. 1,055,701, but the specific product obtainable from N-dihydro-anthraquinone-azin according to our invention differs from the product which is specifically claimed in claim 5 of the said Patent No. 1,055,701 in that it possesses more reddish shades of blue than the parent material, whereas the product claimed specifically in the said patent possesses more greenish shades of blue.

Now what is claimed is:—

1. The process of preparing vat coloring matter of the anthracene series suitable for use as a pigment by oxidizing the separated hydro compound of the said vat coloring matter very gradually in air and in the presence of water and alkali.

2. The process of preparing N-dihydro-anthraquinone-azin suitable for use as a pigment by oxidizing the separated hydro compound or N-dihydro-anthraquinone-azin very gradually in air and in the presence of water and alkali.

3. As a new product a pigment consisting of N-dihydro-anthraquinone-azin in a new physical condition being insoluble in water and in dilute acids and alkalis, slightly soluble in boiling nitrobenzene and soluble in alkaline hydrosulfite solution, forming a vat which dyes cotton blue, and which upon being dissolved in alkaline hydrosulfite solution and being precipitated therefrom by means of a rapid current of air gives rise to a product which, when employed as a pigment possesses considerably less covering power and a less reddish tint of blue than our new product.

In testimony whereof we have hereunto set our hands in the presence of two subscribing witnesses.

RICHARD JUST.
FRITZ ECKHARD.

Witnesses:
J. ALEC. LLOYD,
JOSEPH PFEIFFER.